United States Patent
Moriwaki et al.

(10) Patent No.: US 8,277,051 B2
(45) Date of Patent: Oct. 2, 2012

(54) METHOD FOR CONTROLLING POWER SUPPLY INCLUDING SETTING A FLAG

(75) Inventors: Daisuke Moriwaki, Tokyo (JP); Koichi Ara, Tokyo (JP); Michio Tomizawa, Tokyo (JP)

(73) Assignee: Nec Display Solutions, Ltd., Tokyo (JP)

( * ) Notice: Subject to any disclaimer, the term of this patent is extended or adjusted under 35 U.S.C. 154(b) by 387 days.

(21) Appl. No.: 12/451,704

(22) PCT Filed: May 15, 2008

(86) PCT No.: PCT/JP2008/059400
§ 371 (c)(1),
(2), (4) Date: Nov. 25, 2009

(87) PCT Pub. No.: WO2008/149679
PCT Pub. Date: Dec. 11, 2008

(65) Prior Publication Data
US 2010/0128184 A1 May 27, 2010

(30) Foreign Application Priority Data
May 31, 2007 (JP) ................................. 2007-145117

(51) Int. Cl.
*G03B 21/20* (2006.01)
*G03B 21/00* (2006.01)
(52) U.S. Cl. .......................................... 353/85; 353/121
(58) Field of Classification Search .................. 348/744, 348/748, 750, 759; 353/30, 31, 52, 55, 57, 353/58, 85, 86, 83, 121; 352/198, 202, 203; 362/295, 294; 315/119, 291, 299–305, 307, 315/360
See application file for complete search history.

(56) References Cited

U.S. PATENT DOCUMENTS
7,701,452 B2    4/2010 Fujiwara
(Continued)

FOREIGN PATENT DOCUMENTS
EP    1 640 797 A    3/2006
(Continued)

OTHER PUBLICATIONS

Japanese Office Action dated May 25, 2011, with partial English translation.

*Primary Examiner* — Pascal M Bui Pho
(74) *Attorney, Agent, or Firm* — McGinn IP Law Group, PLLC

(57) ABSTRACT

An apparatus includes a lamp a power supply for supplying power to lamp, an image processing unit for displaying an image according to any one of a plurality of video signals applied externally, and a control unit for causing the power supply to start supplying power to the lamp when at least one of the plurality of video signals is applied in an initial state, checking whether or not any one of the plurality of video signals is applied within a predetermined period of time from the time when the applied video signal is stopped, making the power supply continue to supply power to the lamp if at least one of the plurality of video signals is applied, and making the power supply stop supplying power to the lamp if any one of the plurality of video signals has not been applied.

1 Claim, 4 Drawing Sheets

U.S. PATENT DOCUMENTS

| | | |
|---|---|---|
| 2004/0155590 A1 | 8/2004 | Belliveau |
| 2006/0065125 A1 | 3/2006 | Horiguchi et al. |
| 2006/0109387 A1 | 5/2006 | Kawai |
| 2010/0146429 A1 | 6/2010 | Fujiwara |

FOREIGN PATENT DOCUMENTS

| | | |
|---|---|---|
| JP | 2-311886 A | 12/1990 |
| JP | 2001-133880 * | 5/2001 |
| JP | 2001-133880 A | 5/2001 |
| JP | 2001-255861 A | 9/2001 |
| JP | 2003-274316 | 9/2003 |
| JP | 2004-356989 | 12/2004 |
| JP | 2005-49464 | 2/2005 |
| JP | 2006-67056 | 3/2006 |
| JP | 2006-146048 | 6/2006 |
| JP | 2006-285167 A | 10/2006 |
| JP | 2007-47387 | 2/2007 |

* cited by examiner

METHOD FOR CONTROLLING POWER SUPPLY INCLUDING SETTING A FLAG

BACKGROUND OF THE INVENTION

1. Field of the Invention

The present invention relates to an apparatus for displaying an image such as projectors and display devices, and a method for controlling a power supply.

2. Description of the Related Art

As a light source of a projector, a high-pressure mercury lamp is mainly used. It is necessary for the high-pressure mercury lamp to take a fixed period of time from the start of lighting to reach a stable state. Further, to extend the lamp's lifetime, the lamp has to be cooled down after use. A projector will not start to project an image until the lamp becomes stable even if a command to turn on a lamp's power supply is inputted, and the projector cools down the lamp for the fixed period of time after turning off the lamp's power supply when a command for turning off the lamp's power supply is inputted (see Japanese Patent Application Laid-Open No. 2007-47387). This is similarly applicable to another lamp used for the projector.

In either the time period from turning on the lamp's power supply until a stable lighting state of the lamp is reached, or in the time period from turning off the lamp's power supply until the lamp is cooled down, the projector will not accept a command from the user when the user activates the switch of the lamp's power supply.

A display device for a personal computer (hereinafter, referred to as "PC") has a function in which a power supply is turned on when a video signal is inputted externally, and in which the power supply is turned off when the video signal supplied externally becomes absent. If this function is provided in a projector, a lamp's power supply can be automatically turned on and off, but the following problems may occur.

When the lamp's power supply is turned off because the video signal that has been inputted to the projector is absent, against the user's intention to keep it turned on, the lamp's power supply cannot be turned on until the lamp has cooled down even if the user wants to promptly turn on the lamp's power supply. The user has to wait until the projector is ready to accept a command by means of operating the lamp's on/off switch because the lamp cannot be immediately turned on again until it has cooled down. Further, when the lamp is again turned on, the user has to wait until the lamp reaches a stable state.

SUMMARY OF THE INVENTION

An exemplary object of the invention is to provide an apparatus for displaying an image and a method for controlling the power supply in which on/off control can be performed based on whether a video signal is present or absent in a lamp that places some restriction on the on/off operation.

An apparatus for displaying an image according to an exemplary aspect of the invention includes a lamp which takes a fixed period of time for stabilization of operation from the time that power is supplied to the lamp, a lamp's power supply for supplying power to the lamp, an image processing unit for displaying an image according to any one of a plurality of video signals applied externally, and a control unit for causing the lamp's power supply to start supplying power to the lamp when at least one of the plurality of video signals is applied in an initial state, checking whether or not any one of the plurality of video signals is applied within a predetermined period of time from the time when the applied video signal is stopped, making the lamp's power supply continue to supply power to the lamp if at least one of the plurality of video signals is applied, and making the lamp's power supply stop supplying power to the lamp if any one of the plurality of video signals has not been applied.

A method for controlling a lamp's power supply according to an exemplary aspect of the invention, in an apparatus which comprises a lamp that takes a fixed period of time for stabilization of operation from the time that power is supplied to the lamp, the lamp's power supply for supplying power to the lamp, and an image processing unit for displaying an image according to any one of a plurality of video signals applied externally, the method includes: causing the lamp's power supply to start supplying power to the lamp when at least one of the plurality of video signals is applied in an initial state, checking whether or not any one of the plurality of video signals is applied within a predetermined period of time from the time when the applied video signal is stopped, making the lamp's power supply continue to supply power to the lamp if at least one of the plurality of video signals is applied within the predetermined period of time, and making the lamp's power supply stop supplying power to the lamp if any one of the plurality of video signals has not been applied within the predetermined period of time.

DETAILED DESCRIPTION OF THE EXEMPLARY EMBODIMENT

An apparatus for displaying an image in the present exemplary embodiment is characterized in which the apparatus turns on the lamp's power supply according to an input video signal, and when the input video signal becomes absent, the apparatus checks whether or not any video signal is applied within a predetermined period of time from the time that the input signal is absent, and maintains the lamp's power supply in an on-state when any video signal is applied. An exemplary embodiment will be hereinafter described when the apparatus for displaying an image of the present invention is a projector.

Figure 1:
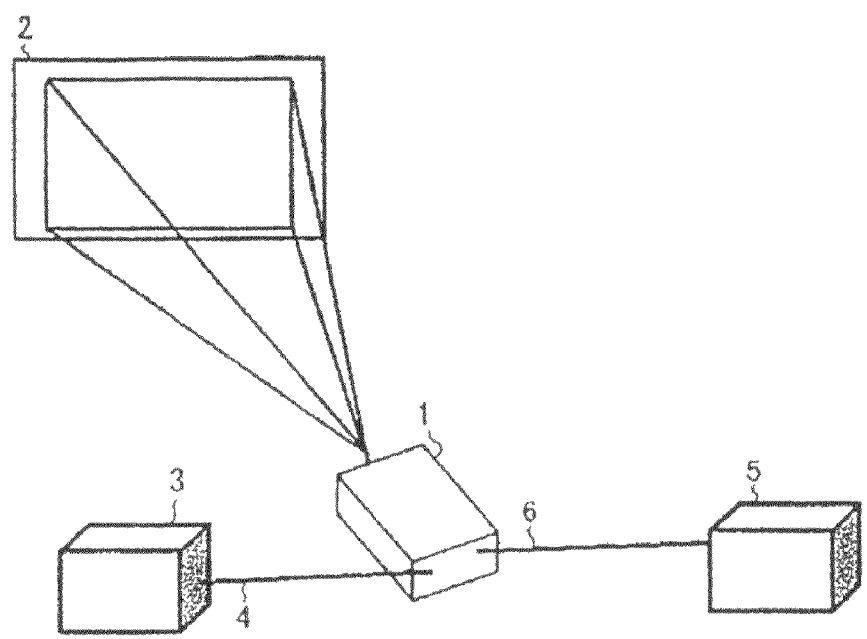
FIG. 1 is a view illustrating one example of a connection between a projector of the present exemplary embodiment and external equipment.

FIG. 1 is a view illustrating one example of a connection between the projector of the present exemplary embodiment and external equipment.

As shown in FIG. 1, projector 1 is connected to apparatus 3 for supplying video to projector 1 through cable 4, and is connected to apparatus 5 for supplying video to projector 1 through cable 6. Hereinafter, apparatus 3 for supplying video to projector 1 is called "video output apparatus 3" and apparatus 5 for supplying video to projector 1 is called "video output apparatus 5".

Video output apparatus 3 and 5 may include information processing devices such as PCs, TVs and DVD players.

Projector 1 receives a video signal from video output apparatus 3 through cable 4, and receives the video signal from video output apparatus 5 through cable 6. Projector 1 projects an image according to the video signal input from video output apparatus 3 or video output apparatus 5 onto screen 2.

Next, a configuration of projector 1 of the present exemplary embodiment will be described.

Figure 2:
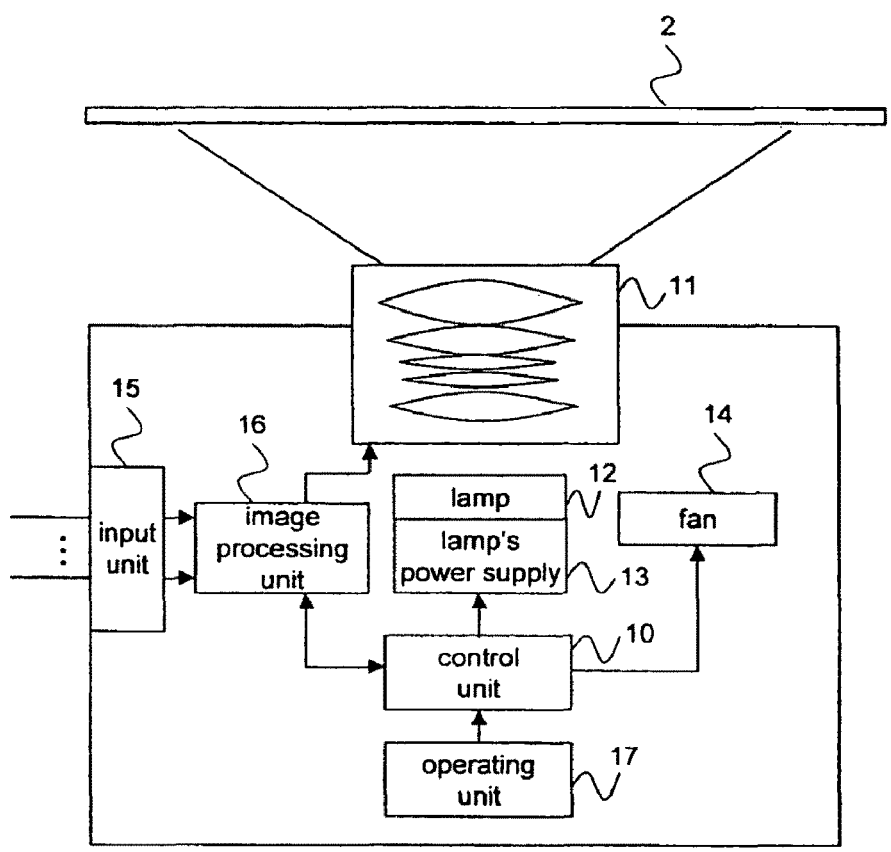
FIG. 2 is a block diagram illustrating one configuration example of the projector of the present exemplary embodiment.

FIG. 2 is a block diagram illustrating one configuration example of the projector of the present exemplary embodiment.

As shown in FIG. 2, projector 1 includes projection lens 11 for projecting an image onto screen 2, lamp's power supply 13 for supplying power to lamp 12, fan 14 for cooling down lamp 12, input unit 15 for connecting to the external equipment, image processing unit 16 for displaying an image according to the video signal input from the external equipment, control unit 10 for controlling each unit, and operating unit 17.

In addition, to realize projector function, projector 1 includes a display unit (not shown) represented by a liquid crystal unit and that partially reflects or passes through light flux from lamp 12 which is a light source, a drive unit (not shown) for driving the display unit based on the video signal from image processing unit 16, and a focus adjuster (not shown) for moving projection lens 11. These units may be similar to a general projector, and its detailed description will be herein omitted.

Input unit 15 includes input terminals for respectively connecting to video output apparatus 3 and 5. The input terminals are RGB input terminals or video input terminals. FIG. 2 shows the case of two input terminals, but the number of the input terminals is not limited to two.

Projection lens 11 has a plurality of lenses for projecting an image formed by a light valve onto screen 2. Moving at least a part of the lenses backward and forward along an optical axis allows the focus position to be adjusted on screen 2. As mechanisms capable of adjusting the focus position, various mechanisms such as a mechanism for the entire moving projection lens 11, and a mechanism for moving some lenses of projection lens 11 may be used.

Image processing unit 16 performs processing of video signals input from external video output apparatus 3 and 5, such as A-D conversion, separation of a synchronizing signal, and writing and reading out image data into/from a frame memory.

Operating unit 17 includes a plurality of control buttons and switches for operating projector 1. A lamp switch used by a user for an on/off operation of lamp 12 is also provided in operating unit 17.

Control unit 10 includes integrated circuits such as an Application Specific Integrated Circuit (ASIC) and a microcomputer for controlling each portion of lamp's power supply 13, fan 14, image processing unit 16, the drive portion (not shown), and the focus adjuster (not shown). In the present exemplary embodiment, a method for controlling lamp's power supply 13 associated with the present invention will be described in detail, and there will be omitted detailed description of methods for controlling image processing unit 16, the focus adjuster and the like.

Moreover, the integrated circuits in control unit 10 further include: a memory circuit for recording a flag that is a criterion for determining whether or not lamp's power supply 13 is turned on when the video signal is inputted; and a counter circuit for measuring the time by using a clock signal. The above flag will be hereinafter called "determination flag".

The determination flag is set by control unit 10 which determines whether or not the video signal is present at any one of the input terminals. "On" set in the determination flag indicates that the video signal is not present at any one of the input terminals. "Off" set in the determination flag indicates that the video signal is present at any one of the input terminals.

In an initial state after activation, the video signal yet has not been inputted, and when control unit 10 determines whether or not the video signal is present in the initial state, the determination flag is set to "on" by control unit 10. When the video signal has been inputted, and subsequently the video signal becomes absent, and control unit 10 determines whether or not the video signal is present, the determination flag is set to "on" by control unit 10. On the other hand, while the video signal is being inputted, control unit 10 determines whether or not the video signal is present, then the determination flag is set to "off" by control unit 10.

When control unit 10 detects the video signal at the input terminal, control unit 10 refers to the determination flag. If the determination flag is "on", control unit 10 recognizes that the video signal has been newly inputted or that the video signal has been inputted once again. Also, when control unit 10 detects the video signal at the input terminal and refers to the determination flag, if the determination flag is "off", control unit 10 recognizes that the video signal is the same as the signal that has been previously detected.

Further, the above memory circuit has information about a search time registered thereinto, the search time being used for checking whether or not there is a terminal to which the video signal has been inputted externally. The search time is a search period that is needed for checking each input terminal in turn to determine whether or not the video signal has been inputted into the input terminal. The time period for one input terminal to determine whether or not the video signal has been inputted is predetermined, and the total time of the time periods may correspond to the search time. In addition, instead of the search time being set in a manner in which the time period that is needed for making a determination, in relation to one input terminal, is predetermined, and in which the total time of the time periods are calculated correspondingly to the number of input terminals, the entire time period that is needed for making the determination, in relation to all of the input terminals, is directly determined, and this entire time period may be the search time.

Control unit 10 checks whether or not the video signal is supplied from video output apparatus 3 or video output apparatus 5 to the input terminals of input unit 15 through image processing unit 16, and determines whether or not lamp's power supply 13 is turned on in accordance with the following procedure when an input video signal is present.

When control unit 10 detects the video signal has been inputted in an initial state after activation, control unit 10 recognizes that the video signal has been newly inputted based on the determination flag being "on", and turns on lamp's power supply 13 because control unit 10 judges that a user has newly supplied a video signal to projector 1 to start projection. Then, control unit 10 changes the determination flag from "on" to "off" to record that the video signal for projection has been inputted.

After lamp's power supply 13 is turned on, while an image according to the video signal received from video output apparatus 3 is projected onto screen 2, if the video signal that has been inputted from video output apparatus 3 becomes absent, then control unit 10 checks, within the search time, all input terminals to determine whether the input video signal is present. In the present exemplary embodiment, because video output apparatus 3 and video output apparatus 5 are connected to the input terminals, control unit 10 determines from which of the two apparatus the video signal has been supplied. When control unit 10 detects the video signal that has been inputted from video output apparatus 5 within the search time, control unit 10 changes the output source of the video signal of an image, which is projected onto screen 2, from video output apparatus 3 to video output apparatus 5.

Subsequently, when the input video signal from video output apparatus 5 becomes absent, control unit 10 again checks, within the search time, all input terminals to determine whether the input video signal is present. As the result of checking within the search time, when control unit 10 determines that no video signal is applied to any one of the input terminals, and control unit 10 then turns off lamp's power supply 13.

After turning off lamp's power supply 13, control unit 10 changes the determination flag from "off" to "on" to record that the video signal has become absent. Subsequently, if the video signal is applied, control unit 10 recognizes that the video signal has been newly inputted because of the "on" of the determination flag, turns on lamp's power supply 13, and again sets the determination flag to "off".

On the other hand, when the input video signal from video output apparatus 5 is continuous, lamp's power supply 13 is turned off, and the input video signal from video output apparatus 5 is also continuous after lamp's power supply 13 was turned off, then control unit 10 leaves the determination flag in the "off" state to maintain a record that the input video signal is continuous. Because a new video signal has not been applied, even if the input video signal is detected, control unit 10 will not turn on lamp's power supply 13.

In addition, unless lamp 12 is being left to reach a state of stabilization of unless it is being subject to a cooling process, lamp's power supply 13 is turned on or off based on the user's command which is implemented when the user operates the lamp's switch.

Next, operation of the projector of the present exemplary embodiment will be described.

Figure 3:
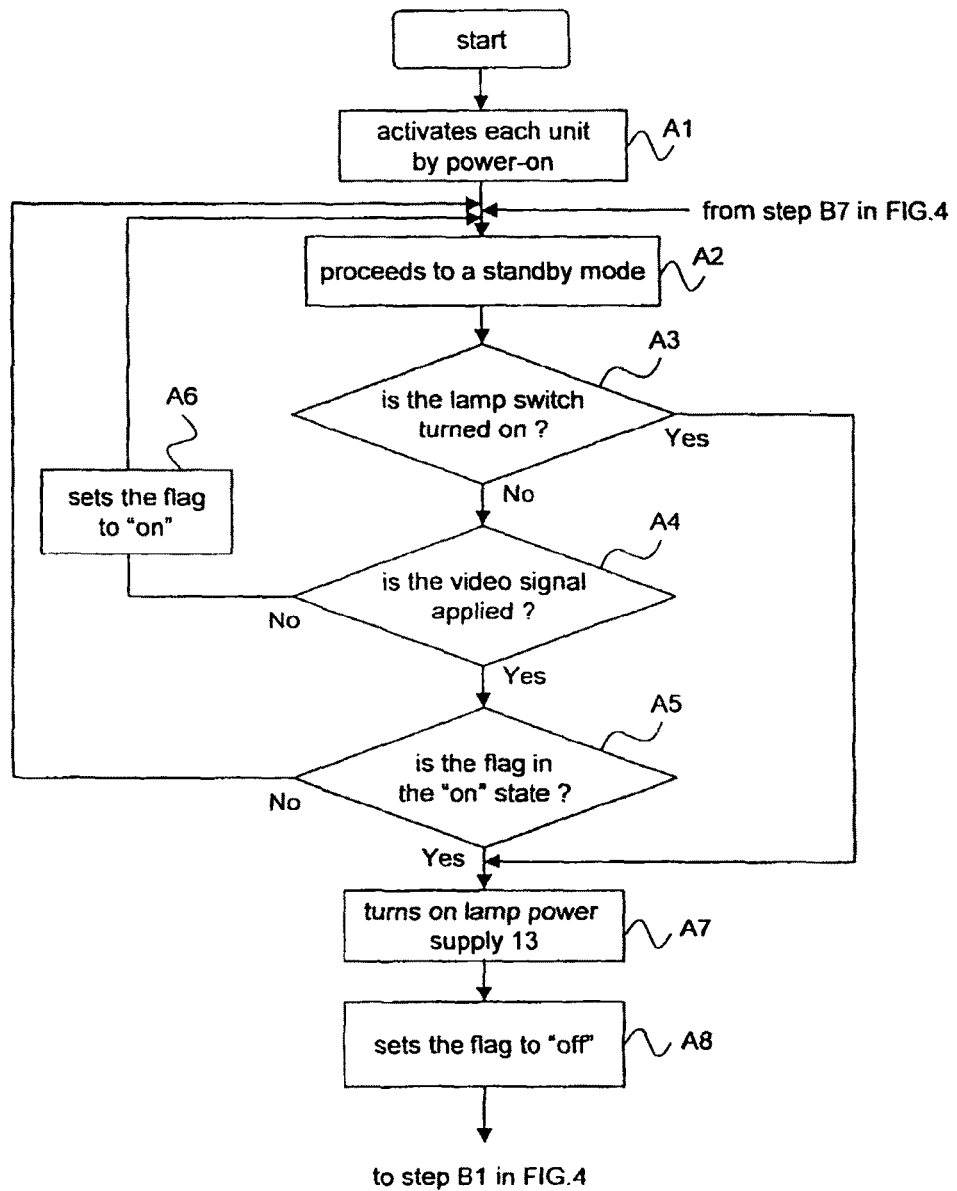
FIG. 3 is a flowchart illustrating operational procedures of the projector of the present exemplary embodiment.
Figure 4:
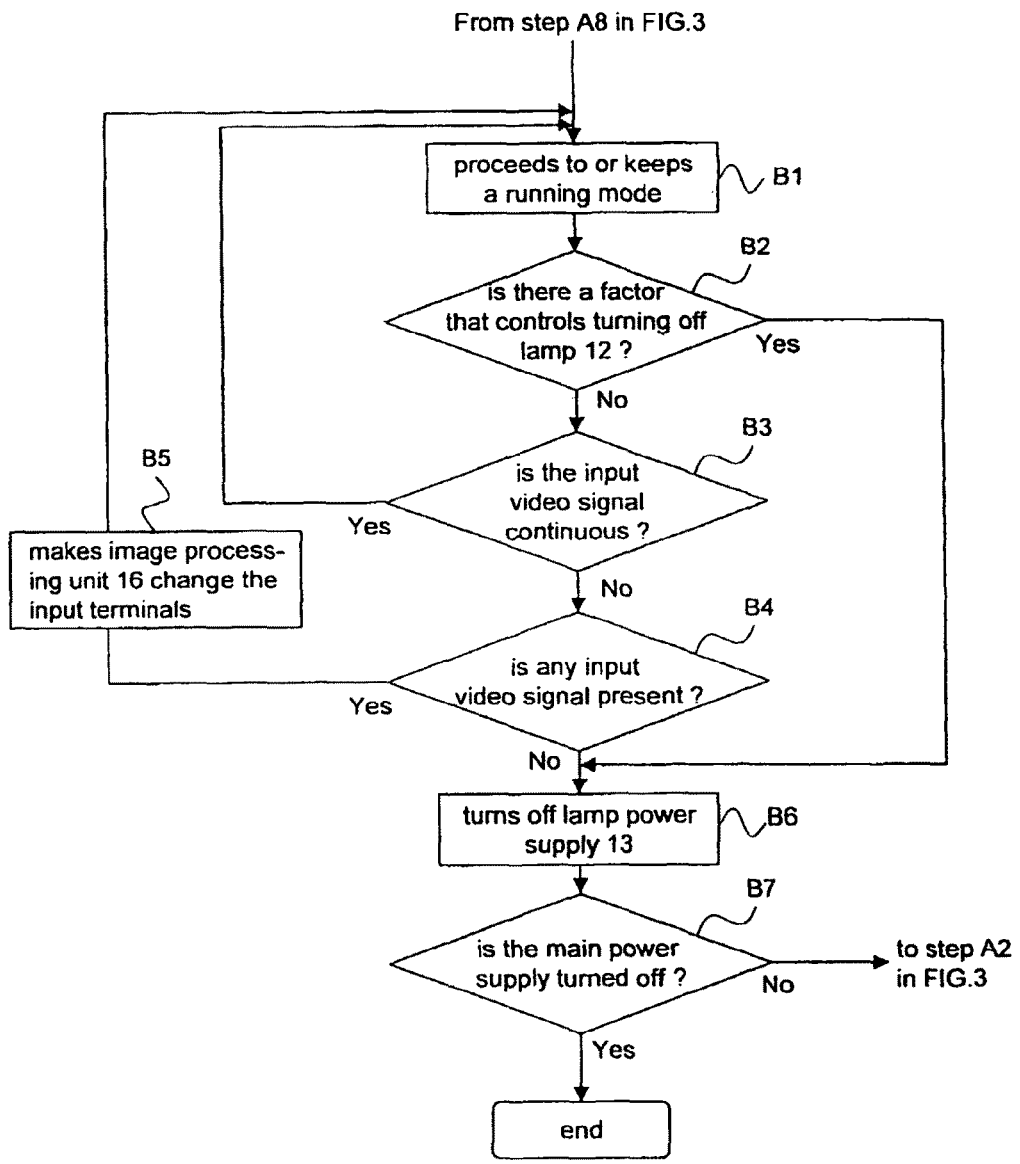
FIG. 4 is a flowchart illustrating the operational procedures of the projector of the present exemplary embodiment.

FIGS. 3 and 4 are flowcharts illustrating operational procedures of the projector of the present exemplary embodiment. FIG. 3 shows the operational procedures in an activation and standby state, and FIG. 4 shows the operational procedures in use.

When a main power supply of projector 1 is powered on, projector 1 sets the determination flag to "on", activates each unit (step A1), and moves to a standby mode in which lamp 12 can be powered on (step A2).

After projector 1 proceeds to the standby mode, projector 1 determines whether or not the lamp switch is turned on (step A3). When the lamp switch is not turned on, projector 1 checks whether or not the video signal is applied to the input terminals of input unit 15 (step A4). When the video signal is not applied to any one of the input terminals, projector 1 reads the determination flag, and if the flag is "on", projector 1 leaves the flag in this state. If the flag is "off", projector 1 changes the flag from "off" to "on" (step A6). In step A6, a specific example in which projector 1 changes the flag from "off" to "on" will be described later.

After step A6, projector 1 returns to the standby mode in step A2. When the lamp switch is not turned on, and the video signal is not applied to any one of the input terminals, then projector 1, remaining in the standby mode, repeats the determination in step A3 and step A4.

When the video signal is applied to any one of the input terminals of input unit 15 in step A4, projector 1 determines whether or not the determination flag is "on" (step A5). If the flag is "on", projector 1 turns on lamp's power supply 13 (step A7). If the flag is "off" in step A5, projector 1 returns to the standby mode of step A2.

On the other hand, when the lamp switch is turned on in step A3, projector 1 turns on lamp's power supply 13 (step A7). After step A7, projector 1 sets the determination flag to "off" (step A8). The reason why the determination flag is set to "off" in this step A8 will be described later.

When lamp's power supply 13 is turned on in step A7 in the flowchart shown in FIG. 3, and after waiting for the lamp to stabilize, projector 1, as shown in FIG. 4, moves to a state in which an image is projected, that is, a running mode (step B1). Here, the video signal is applied to any one of the plurality of input terminals, and this video signal provides original data for an image which will be projected onto screen 2. An image to be projected onto screen 2 is hereinafter referred to as "projected image".

After proceeding to the running mode, projector 1 determines whether or not there is a factor that controls turning off lamp's power supply 13 (step B2). One such factor would be operation of the switch by the user who turns off the lamp. It is thought that another factor may be the occurrence of an abnormal situation, and input of a control signal of a command sent from the external equipment to turn off the lamp's power supply. If the abnormal situation occurs, projector 1 turns off lamp's power supply 13 according to predetermined control for securing safety when projector 1 recognizes that a fatal problem has arisen in a main body.

When there are no factors to control turning off lamp's power supply 13 in step B2, projector 1 determines whether or not the input video signal that provides a source of the projected image continues to be present (step B3). When detecting the continuous presence of an input video signal that provides the source of the image being projected, projector 1 maintains the running mode (step B1). Projector 1, maintaining the running mode, repeats the determination of step B2 and step B3.

When in step B3 it is determined that the input video signal, that projector 1 recognized, has become absent, projector 1 checks, within the search time, all the input terminals, including the terminal that has lost the input video signal, one-by-one, to determine whether or not any input video signal is present (step B4). When detecting the input video signal at any one of the input terminals within the search time, projector 1 makes image processing unit 16 change from the input terminal to which the video signal is not applied to the input terminal to which the video signal is applied, to project the image based on the video signal received (step B5), and maintains the running mode (step B1).

A specific example of operation from step B3 to step B5 will be described. When the user, in the running mode of projector 1, switches the video signal that provides the output source of the projected image of projector 1 from video output apparatus 3 to video output apparatus 5, projector 1 projects the image according to the video signal from video output apparatus 3 in step B1 after the operation of step B3, and projects the image according to the video signal from video output apparatus 5 in step B1 after the operation of step B5.

On the other hand, when the input video signal has not been detected at any one of the input terminals within the search time in step B4, projector 1 turns off lamp's power supply 13 (step B6). Subsequently, projector 1 makes fan 14 operate for a certain period of time to cool down lamp 12. Subsequently, if the main power supply is not turned off, projector 1 proceeds to the standby mode of step A2 in FIG. 3 (step B7).

Here, the reason why the determination flag is set to "off" in step A8 shown in FIG. 3 will be described.

In step B2 shown in FIG. 4, while the video signal is being continuously applied to projector 1, lamp's power supply 13 is forcedly turned off, and then lamp 12 is cooled down, and subsequently, projector 1 goes to the standby mode of step A2, then, projector 1 proceeds to step A4 if the user does not intend to turn on lamp 12 again. Here, because the video signal remains in an input state, projector 1 proceeds to the determination of step A5. If step A8 is not processed, the determination flag remains in the "on" state, and projector 1 will proceed to step A7, and turn on lamp's power supply 13.

Even if the user turns off the lamp switch, projector 1 proceeds to the standby mode after lamp 12 is cooled down, and will turn on lamp's power supply 13 against the user's intention to turn off lamp's power supply 13 when the video signal applied to projector 1 is present. Then, the user cannot turn off lamp's power supply 13 until lamp 12 stabilizes. To prevent these situations from occurring, it is necessary to set the determination flag to "off" in step A8.

Next, it will be explained why lamp's power supply 13 can be turned on again by supplying the video signal to projector 1, without the user's operation of the lamp switch after lamp's power supply 13 is turned off once, even if the above control is carried out. Here, it will be assumed that supplying of the video signal to projector 1 is switched from video output apparatus 3 to video output apparatus 5.

It is assumed that projector 1 is in the running mode for projecting an image according to the video signal from video output apparatus 3 (step B1). Thus, in step A8 shown in FIG. 3, the determination flag has already been set to "off". The user turns off the lamp switch in step B2, and stops supplying the video signal from video output apparatus 3 to projector 1. Ways by which the supplying the video signal can be stopped may include the manner in which the user operates video output apparatus 3, a method in which the user pulls cable 4 out of projector 1, and so on.

After cooling down lamp 12, projector 1 moves to step A2 shown in FIG. 3. Because an operation of switching on the lamp is not done (step A3), and the video signal is not applied (step A4), projector 1 switches the determination flag from "off" to "on" (step A6), and returns to the standby mode. Subsequently, when the video signal is supplied from video output apparatus 5 to projector 1 by a user's operation of video output apparatus 5, projector 1 proceeds from step A4 to step A5. Because the determination flag has been set to "on" in step A6, projector 1 turns on lamp's power supply 13 (step A7).

In such a manner, even after lamp's power supply 13 is turned off once, supplying the video signal to projector 1 is stopped temporarily, and the video signal, subsequently, is applied again so as to turn on lamp's power supply 13.

In the present exemplary embodiment, when the video signal is applied, the lamp's power supply is turned on, and when the input video signal becomes absent, a check is made to determined whether or not the video signal is applied again within a predetermined period of time from stoppage of the input, and if the video signal is applied, the lamp's power supply is kept in the "on" state.

Herewith, the user does not have to push the lamp switch to turn on the lamp's power supply, and further, the lamp's power supply can be prevented from being turned off against the user's intention to leave the lamp's power supply on when the video signal is supplied again to the projector within the predetermined period of time even if the input video signal became absent. As the result, the user need not wait until the process for cooling the lamp has been completed, to turn on the lamp again, and also need not wait until the lamp has become stabilized after the lamp was turned on again.

Further, the user turns off the lamp's power supply to stop using the projector, and subsequently even if the input video signal to the projector is left, the lamp's power supply can be prevented from being turned on against the user's intention to turn off the lamp's power supply. As the result, the user need not wait until the lamp has proceeded to a stable state in which the lamp can be turned off. In this case, optical components can avoid deterioration caused by unnecessary lighting of the lamp.

An exemplary advantage according to the invention is that on/off control of the lamp is allowed based on the presence or absence of an input video signal even if some restriction is placed on turning the lamp on or off, and unnecessary on/off operation of the lamp can be prevented.

An exemplary advantage according to the invention is that even when the video signal which has been applied becomes absent, on/off control of the lamp is performed with the presence or absence of input of another input video signal being checked, thereby preventing unnecessary on/off operation of the lamp.

In the present exemplary embodiment, the present invention has been described referring to the case of the projector, but it is not limited to the projector, and the control method of the present invention can be applied to an apparatus using a lamp which takes a fixed period of time to stabilize from the start of receiving power, such as a lamp in a projector.

The present invention has a beneficial effect on an apparatus for displaying an image such as a projector that takes a fixed period of time to turn a lamp on/off, the problem described above does not occur in a device such as a display device for PCs and the power supply can be immediately turned on/off depending on the presence or absence of an input video signal.

In addition, the flowcharts shown in FIGS. 3 and 4 are intended to describe a part associated with the present invention, and among the operational procedures shown, operation for another control may be added.

Further, control unit 10 may include: a Central Processing Unit (CPU) for executing a program in which information for controlling each unit is written; and a memory for storing the program.

In addition, it is explained that the circuit for recording the flag is the memory circuit in this exemplary embodiment, but the circuit for recording the flag may be a logic circuit that is switched between an "on" state and an "off" state when a signal is applied externally.

Furthermore, the present exemplary embodiment has been described with reference to the case of a plurality of input terminals, but the input terminal may be a single terminal.

While the invention has been particularly shown and described with reference to an exemplary embodiment thereof, the invention is not limited to this embodiment. It will be understood by those of ordinary skill in the art that various changes in form and details may be made therein without departing from the spirit and scope of the present invention as defined by the claims.

This application is based upon and claims the benefit of priority from Japanese Patent Application No. 2007-145117 filed on May 31, 2007, the content of which is incorporated by reference.

What is claimed is:

1. A method for controlling a lamp's power supply in an apparatus, which comprises a lamp that takes a fixed period of time for stabilization of operation from a time that power is supplied to said lamp, said lamp's power supply for supplying power to said lamp, and an image processing unit for displaying an image according to any one of a plurality of video signals applied externally, said method comprising:

causing said lamp's power supply to start supplying power to said lamp when at least one of said plurality of video signals is applied in an initial state, checking whether or not any one of said plurality of video signals is applied within a predetermined period of time from a time when said applied video signal is stopped, making said lamp's power supply continue to supply power to said lamp if at least one of said plurality of video signals is applied within said predetermined period of time, and making said lamp's power supply stop supplying power to said lamp if any one of said plurality of video signals has not been applied within said predetermined period of time;

making said lamp's power supply stop supplying power to said lamp when a command for turning off said lamp is applied, and ensuring that said lamp's power supply continues to stop supplying power to said lamp when said video signal, that has been applied before a supply of power to said lamp was stopped, is continuously applied after said supply of power to said lamp was stopped;

setting a flag to "on" in said initial state, said flag being a criterion for determining whether or not said lamp is turned on when any one of said plurality of video signals is applied, setting said flag to "off" when making said lamp's power supply start supplying power to the lamp, setting said flag to "on" if any one of said plurality of video signals has not been applied after said applied video signal is stopped, ensuring that said lamp's power supply continues to stop supplying power to said lamp if said flag is "off" when any one of said plurality of video signals is applied, and making said lamp's power supply start supplying power to said lamp if said flag is "on" when any one of said plurality of video signals is applied.

* * * * *